(12) United States Patent
Zotov et al.

(10) Patent No.: US 10,488,429 B2
(45) Date of Patent: Nov. 26, 2019

(54) RESONANT OPTO-MECHANICAL ACCELEROMETER FOR USE IN NAVIGATION GRADE ENVIRONMENTS

(71) Applicant: General Electric Company, Schenectady, NY (US)

(72) Inventors: Sergey Alexandrovich Zotov, Glenville, NY (US); Ansas Matthias Kasten, Niskayuna, NY (US); Yizhen Lin, Cohoes, NY (US); Jason Harris Karp, Niskayuna, NY (US); William Albert Challener, Glenville, NY (US); Aaron Jay Knobloch, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 15/618,332

(22) Filed: Jun. 9, 2017

(65) Prior Publication Data
US 2018/0246139 A1    Aug. 30, 2018

Related U.S. Application Data

(60) Provisional application No. 62/464,626, filed on Feb. 28, 2017.

(51) Int. Cl.
| | | |
|---|---|---|
| *G01P 15/097* | (2006.01) | |
| *G01P 15/08* | (2006.01) | |
| *G01P 15/093* | (2006.01) | |

(52) U.S. Cl.
CPC ........ *G01P 15/093* (2013.01); *G01P 15/0802* (2013.01); *G01P 15/097* (2013.01); *G01P 2015/0837* (2013.01)

(58) Field of Classification Search
CPC ................. G01P 15/093; G01P 15/097; G01P 2015/0837
(Continued)

(56) References Cited

U.S. PATENT DOCUMENTS

| | | | | |
|---|---|---|---|---|
| 5,023,944 A | * | 6/1991 | Bradley | ................. G02F 1/218 348/343 |
| 5,610,335 A | * | 3/1997 | Shaw | .................... B81B 3/0051 73/514.36 |

(Continued)

FOREIGN PATENT DOCUMENTS

| | | |
|---|---|---|
| EP | 2 902 791 A1 | 8/2015 |
| EP | 3 093 671 A1 | 11/2016 |

OTHER PUBLICATIONS

P E Schmid., "Optical absorption in heavily doped silicon", Physical Review B, vol. 23, Issue: 10, May 15, 1981.

(Continued)

*Primary Examiner* — Jacques M Saint Surin
(74) *Attorney, Agent, or Firm* — Armstrong Teasdale LLP

(57) ABSTRACT

An accelerometer includes a controller, a light source operatively coupled to the controller, and a bifurcated waveguide coupled to the light source and configured to receive light output by the light source. The bifurcated waveguide includes a first waveguide portion and a second waveguide portion. The accelerometer also includes a first resonator operatively coupled to the controller and configured to receive light from the first waveguide portion, and a second resonator operatively coupled to the controller and configured to receive light from the second waveguide portion. The first resonator includes a first proof mass, and the second resonator includes a second proof mass.

22 Claims, 3 Drawing Sheets

(58) Field of Classification Search
USPC .................................................... 73/514.26
See application file for complete search history.

(56) References Cited

U.S. PATENT DOCUMENTS

| | | | |
|---|---|---|---|
| 7,091,715 | B2 | 8/2006 | Nemirovsky et al. |
| 7,191,653 | B2 | 3/2007 | Park et al. |
| 7,581,443 | B2 | 9/2009 | Kubena et al. |
| 7,583,390 | B2 * | 9/2009 | Carr .................. G01L 9/0079 356/35.5 |
| 7,765,869 | B2 * | 8/2010 | Sung .................. G01C 19/56 73/504.04 |
| 9,383,208 | B2 | 7/2016 | Mohanty |
| 2007/0119258 | A1 | 5/2007 | Yee |
| 2009/0241665 | A1 * | 10/2009 | Novack ............... G01P 15/097 73/514.29 |
| 2014/0283601 | A1 * | 9/2014 | Bhave ................ G01P 15/093 73/504.12 |
| 2015/0020590 | A1 | 1/2015 | Painter et al. |
| 2016/0139171 | A1 * | 5/2016 | Becka ................ G01P 15/032 73/514.29 |
| 2016/0195397 | A1 * | 7/2016 | Bramhavar ........ G01C 19/5719 73/514.26 |
| 2016/0349283 | A1 * | 12/2016 | Bramhavar .......... G01P 15/093 |
| 2016/0377647 | A1 | 12/2016 | Fertig et al. |
| 2018/0128850 | A1 * | 5/2018 | Bramhavar .............. B81B 3/00 |
| 2018/0209791 | A1 * | 7/2018 | Chang .................. G01P 15/097 |

OTHER PUBLICATIONS

Albrecht et al., "Frequency modulation detectionusing high-Q cantilevers for enhancedforce microscope sensitivity", Journal of Applied Physics, vol. 69, Issue: 2, pp. 668-673, 1990.

Jacobs-Cook., "MEMS versus MOMS from a systems point of view", Journal of Micromechanics and Microengineering, vol. 6, Issue: 1 pp. 148-156, 1996.

Zalalutdinov et al., "Autoparametric optical drive for micromechanical oscillators", Applied Physics Letters, vol. 79, Issue: 5, pp. 695-697, 2001.

Ashwin Arunkumar Seshia., "Integrated Micromechanical Resonant Sensors for Inertial Measurement Systems", pp. 140, 2002.

Coldren et al.,"Tunable Semiconductor Lasers", Journal of Lightwave Technology, vol. 22, Issue: 1, pp. 193, 2004.

Hopkins et al., "The silicon oscillating accelerometer: A high-performance MEMS accelerometer for precision navigation and strategic guidance applications", MA, pp. 4-12, Jun. 27-29, 2005.

J R Vig., "Quartz Crystal Resonators and Oscillators; For Frequency Control and Timing Applications: A Tutorial", Revision: 8.5.3.6, Jan. 2007.

Sundaresan et al., "Electronically Temperature Compensated Silicon BAW Reference Oscillators", IEEE Journal of Solid-State Circuits, vol. 42, Issue: 6, pp. 1425-1434, Jun. 2007.

Sung et al., "A vibration-controlled resonant accelerometer design and its application to the single structured gyroscope/accelerometer system", 2007 IEEE International Conference on Vehicular Electronics and Safety, pp. 1-6, 2007, Beijing.

Zotov et al., "High-Range Angular Rate Sensor Based on Mechanical Frequency Modulation", Journal of Microelectromechanical Systems, vol. 21, Issue: 2, pp. 398-405, Apr. 2012.

"Multiparameter Fiber Optic Sensing Systemfor Monitoring Enhanced GeothermalSystems", Final Report, DOE EERE—GeothermalTechnologies Program, Award No. DE-EE0002787, Dec. 31, 2012.

Challener et al., "MOEMS pressure sensors for geothermal well monitoring", MOEMS and Miniaturized Systems XII, vol. 8616, Mar. 13, 2013.

Zotov et al., "Investigation of Energy Dissipation in Low Frequency Vibratory MEMS Demonstrating a Resonator with 25 Minutes Time Constant", Microsystems Laboratory, Jun. 2014, USA.

Zotov et al., "Self-Calibrated MEMS Gyroscope with AM/FM Operational Modes, Dynamic Range of 180 dB and in-run bias stability of 0.1 deg/hr", Inertial Sensors and Systems Symposium (ISS), 2014 DGON, pp. 1-17, Sep. 2014, Karlsruhe.

Zotov et al., "High Quality Factor Resonant MEMS Accelerometer With Continuous Thermal Compensation", IEEE Sensors Journal, vol. 15, Issue: 9, pp. 5045-5052, Sep. 2015.

Microsemi, 9920-60, "http://www.microsemi.com/products/timing-synchronization-systems/time-frequency-references/high-reliability- ruggedized-oscillators.", Retrieved on: Feb. 13, 2017.

Fitel, FRL15DC, "http://www.furukawa.co.jp/fitel/english/active/pdf/signal/ODC-7R003D_FRL15DCWx-A8x-W1510,1625.pdf", Retrieved on: Feb. 13, 2017.

Dong, Y. et al., "A high performance accelerometer with a fifth-order sigma—delta modulator," Journal of Micromechanics and Microengineering, vol. 15, pp. 1-8, 2005.

Dias, R. et al., "Pull-in based μg-resolution accelerometer: Characterization and noise analysis," Sensors and Actuators A,:Physical, vol. 172, No. 1, pp. 47-53, Dec. 2011.

Dong, Y. et al., "Ultra-high precision MEMS accelerometer," in Proc. Transducers, Jun. 5-9, 2011, pp. 695-698.

Stewart, R. et al., "MEMS low cost inertial grade accelerometers and gyros using a common, bulk micromachining process," in Proc. Amer. Inst. Aeronautics Astron., 1999, pp. 736-742.

Zwahlen, P. et al., "Breakthrough in high performance inertial navigation grade sigma-delta MEMS accelerometer," in Proc. IEEE/ION Position, Location Navigat. Symp., Apr. 2012, pp. 15-19.

Abdolvand, R. et al., "Sub-micro-gravity in-plane accelerometers with reduced capacitive gaps and extra seismic mass," Journal of Microelectromechanical Systems, vol. 16, No. 5 (2007): 1036-1043.

Extended European Search Report and Opinion issued in connection with corresponding EP Application No. 17208204.2 dated May 14, 2018.

\* cited by examiner

US 10,488,429 B2

RESONANT OPTO-MECHANICAL ACCELEROMETER FOR USE IN NAVIGATION GRADE ENVIRONMENTS

CROSS REFERENCE TO RELATED APPLICATIONS

This application claims the benefit of U.S. Provisional Patent Application No. 62/464,626, filed Feb. 28, 2017, which is hereby incorporated by reference in its entirety.

STATEMENT REGARDING FEDERALLY SPONSORED RESEARCH AND DEVELOPMENT

This invention was made with Government support under contract number N66001-16-C-4015 awarded by the Defense Advanced Research Projects Agency. The Government has certain rights in this invention.

BACKGROUND

The subject matter disclosed herein relates to a resonant opto-mechanical accelerometer and, more particularly, to a resonant opto-mechanical accelerometer for use in navigation grade environments.

At least some known accelerometers have been developed on micro-electro-mechanical systems ("MEMS") architectures. Some of these accelerometers may include a proof mass mounted on a piezoelectric substrate. As the proof mass experiences a change in acceleration, the proof mass compresses the piezoelectric substrate to generate an output current proportional to the acceleration of the proof mass. Other known accelerometers may include a deformable optical resonator that is compressed, like a piezoelectric substrate, when a proof mass coupled to the optical resonator experiences a change in acceleration.

Many such accelerometers have demonstrated high performance for targeting and inertial applications through the use of temperature postcompensation at accelerations of approximately one μg, where one "g" corresponds to the acceleration due to gravity at the Earth's surface and is approximately equal to 9.806 m/s$^2$. However, such accelerometers may not be well suited to service under certain environmental conditions and may not exhibit a dynamic range of operation suitable for use with some inertial navigation systems.

BRIEF DESCRIPTION

In one aspect, an accelerometer is provided. The accelerometer includes a controller, a light source operatively coupled to the controller, and a bifurcated waveguide coupled to the light source and configured to receive light output by the light source. The bifurcated waveguide includes a first waveguide portion and a second waveguide portion. The accelerometer also includes a first resonator operatively coupled to the controller and configured to receive light from the first waveguide portion, and a second resonator operatively coupled to the controller and configured to receive light from the second waveguide portion. The first resonator includes a first proof mass, and the second resonator includes a second proof mass.

In another aspect, a resonator for use in an accelerometer is provided. The resonator includes a substrate, a transparent cover, and a proof mass mounted between the substrate and the transparent cover. The proof mass includes a central portion, a first spring, a first portion coupled to the central portion by the first spring, a second spring, and a second portion coupled to the central portion by the second spring.

In yet another aspect, an accelerometer is provided. The accelerometer includes a light source, a waveguide coupled to the light source configured to receive light output by the light source, and a resonator, which includes a proof mass, and which is configured to receive light from the waveguide.

DRAWINGS

These and other features, aspects, and advantages of the present disclosure will become better understood when the following detailed description is read with reference to the accompanying drawings in which like characters represent like parts throughout the drawings, wherein.

Figure 1:
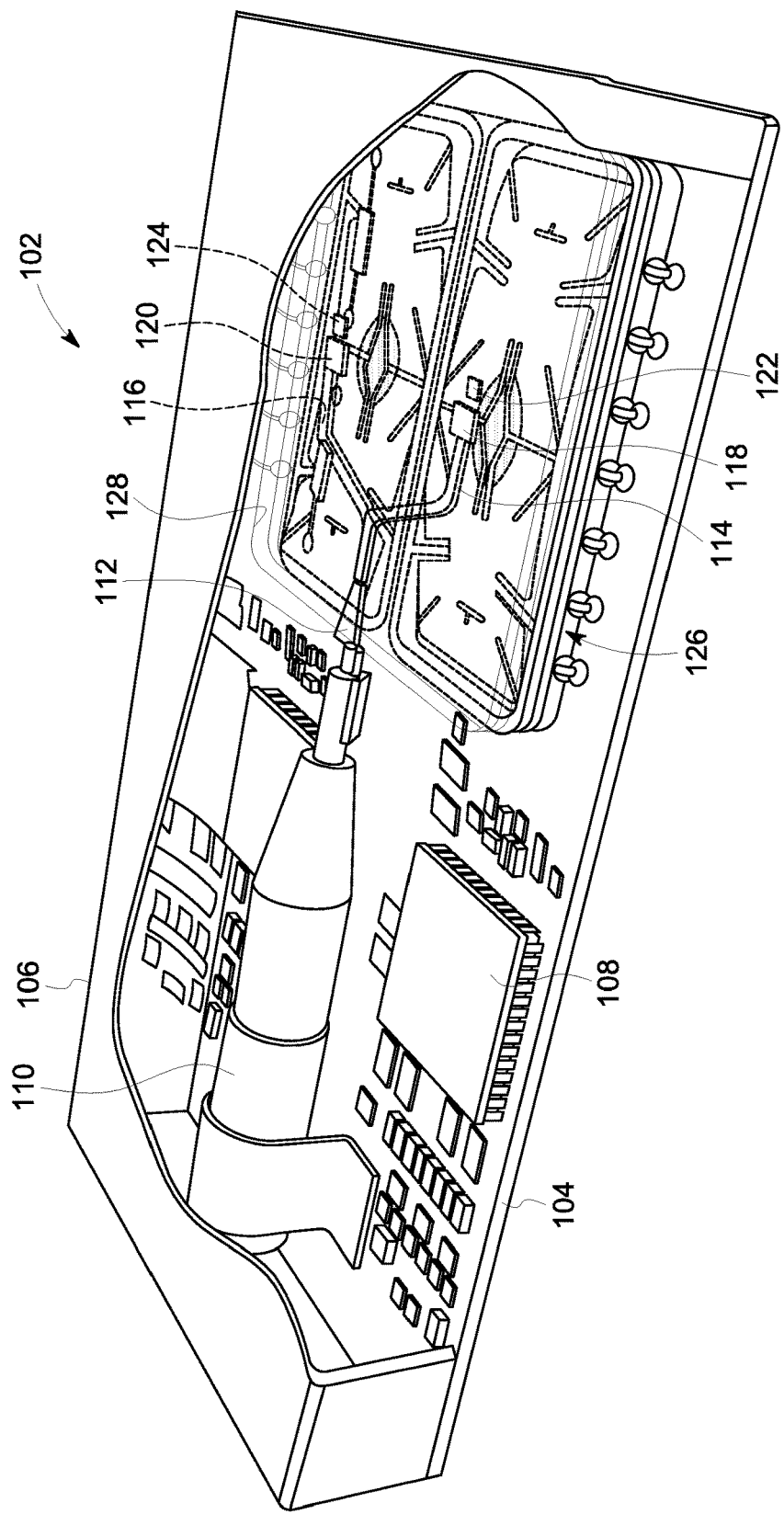
FIG. 1 is a perspective view of an exemplary resonant opto-mechanical accelerometer.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device," "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with a user interface such as a mouse and a keyboard. Alternatively, other computer peripherals may also be used that may include, for example, but not be limited to, a scanner. Furthermore, in the exemplary embodiment, additional output channels may include, but not be limited to, a user interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, "g-force" acceleration is a measurement of acceleration caused by a mechanical force exerted on a body, such as an accelerometer, in a direction by a surface supporting the object and preventing the object from free fall. Similarly, as used herein, a unit of measurement of acceleration may be expressed as a "g," which in the international system of units, corresponds to m/s². One g is thus the acceleration due to gravity at the Earth's surface and is approximately equal to 9.806 m/s².

Embodiments of the present disclosure relate to a resonant opto-mechanical accelerometer and, more particularly, to a resonant opto-mechanical accelerometer for use in navigation grade environments. As described herein, navigation grade environments include environments associated with and/or onboard various navigational systems, such as, for example, aircraft systems, marine systems, terrestrial systems, and/or munitions systems, such as missile and other ballistic systems. As such, navigation grade environments may expose the resonant opto-mechanical accelerometer to rapidly fluctuating g-forces as well as to extreme environmental conditions.

In addition, as described below, the resonant opto-mechanical accelerometer may be a single axis accelerometer (e.g., a z-axis accelerometer) configured to measure acceleration perpendicular to a resonator plane. However, the resonant opto-mechanical accelerometer may also measure accelerations about other axes (e.g., depending upon the orientation of the accelerometer) and may, in addition, measure accelerations about a plurality of axes (e.g., where a plurality of resonator and/or resonator pairs are utilized).

The resonant opto-mechanical accelerometer includes a light source, such as a laser, a first resonator, and a second resonator. A resonance frequency of each resonator is responsive to an acceleration, and the light source shines a light beam on each resonator. The resonators modulate the light to a frequency that corresponds to the resonance frequency, and the modulated light is sensed at each resonator by a corresponding photodetector. The photodetectors generate first and second electrical output signals in response, and these electrical output signals are used to generate a temperature independent acceleration measurement. More particularly, the first and second resonator are operated as a pair, each having and opposite scale factor, to provide robustness against common mode errors, such as temperature drift. Moreover, a plurality of electrodes are disposed in relation to each resonator, such that one or more proof masses associated with each resonator may be dynamically balanced and/or a scale factor associated with the modulated light increased or decreased as a function of acceleration.

FIG. 1 is a perspective view of an exemplary resonant opto-mechanical accelerometer ("ROMA") 102. ROMA 102 includes a printed circuit board ("PCB") 104. A controller 108 is mounted on PCB 104. As described elsewhere herein, controller 108 coordinates the operation of ROMA 102. In the exemplary embodiment, controller 108 includes one or more processors communicatively coupled to one or more tangible, non-transitory, computer-readable memories.

A light source 110 is also mounted on PCB 104. Light source 110 is any light source capable of generating a beam of monochromatic light and/or any other beam of radiation. In the exemplary embodiment, light source 110 is a laser, such as a continuous-wave laser and/or a pulsed operation laser. Light source 110 may, in addition, be a low power laser, such as, in some embodiments, a laser having an output power ranging from ten milliwatts to fifty milliwatts. Further, in various embodiments, more than one light source may be implemented with ROMA 102. Light source 110 may be operatively coupled to controller 108, such that controller 108 provides one or more control instructions or control signals to light source 110 for the operation of light source 110.

An optical waveguide 112 is coupled to light source 110, such that optical waveguide 112 is capable of receiving and guiding a light beam generated by light source 110. In the exemplary embodiment, optical waveguide 112 is bifurcated and branches into a first branch or first portion 114 and a second branch or second portion 116. Optical waveguide 112 includes any waveguide suitable for the transmission of light, such as any light guide, any fiber optic waveguide structure, any integrated waveguide structure patterned on a cover of ROMA 102 (as described below), and the like.

A first photodetector 122 is disposed at a first output coupler or first end 118 of first portion 114. Similarly, a second photodetector 124 is disposed at a second output coupler or second end 120 of second portion 116. First end 118 may include a mirror, prism reflector, or grating coupler (not shown) configured to redirect a beam of light traveling within first portion 114 of optical waveguide 112 towards a first resonator 126. Likewise, second end 120 may include a mirror, prism reflector, or grating coupler (not shown) configured to redirect a beam of light traveling within second portion 116 of optical waveguide 112 towards a second resonator 128.

In the exemplary embodiment, first resonator 126 and second resonator 128 are mounted on PCB 104 and form a resonator package or resonator pair. In other embodiments, first resonator 126 and/or second resonator 128 are not mounted on PCB 104, and may be located or mounted apart from PCB 104, controller 108, and/or other control electronics.

First resonator 126 and/or second resonator 128 are operatively coupled to controller 108, such that controller 108 provides one or more control instructions or control signals to first resonator 126 and/or second resonator 128 for the operation of first resonator 126 and/or second resonator 128. For example, in some embodiments, controller 108 provides one or more control signals to first resonator 126 and/or second resonator 128 to control the voltages generated by one or more electrodes coupled to each resonator 126 and/or 128 (as described below). Similarly, in various embodiments, controller 108 provides one or more control signals to first resonator 126 and/or second resonator 128 to control the output power of light source 110.

ROMA 102 may, in addition, be enclosed within a housing 106, which may serve as an environmental enclosure suitable to shelter ROMA 102 from air and moisture. In some embodiments, housing 106 is also heat resistant and functions as a heat shield suitable to shelter ROMA 102 from heat generated by a navigation or propulsion system to which ROMA 102 is mounted or coupled.

Figure 2:
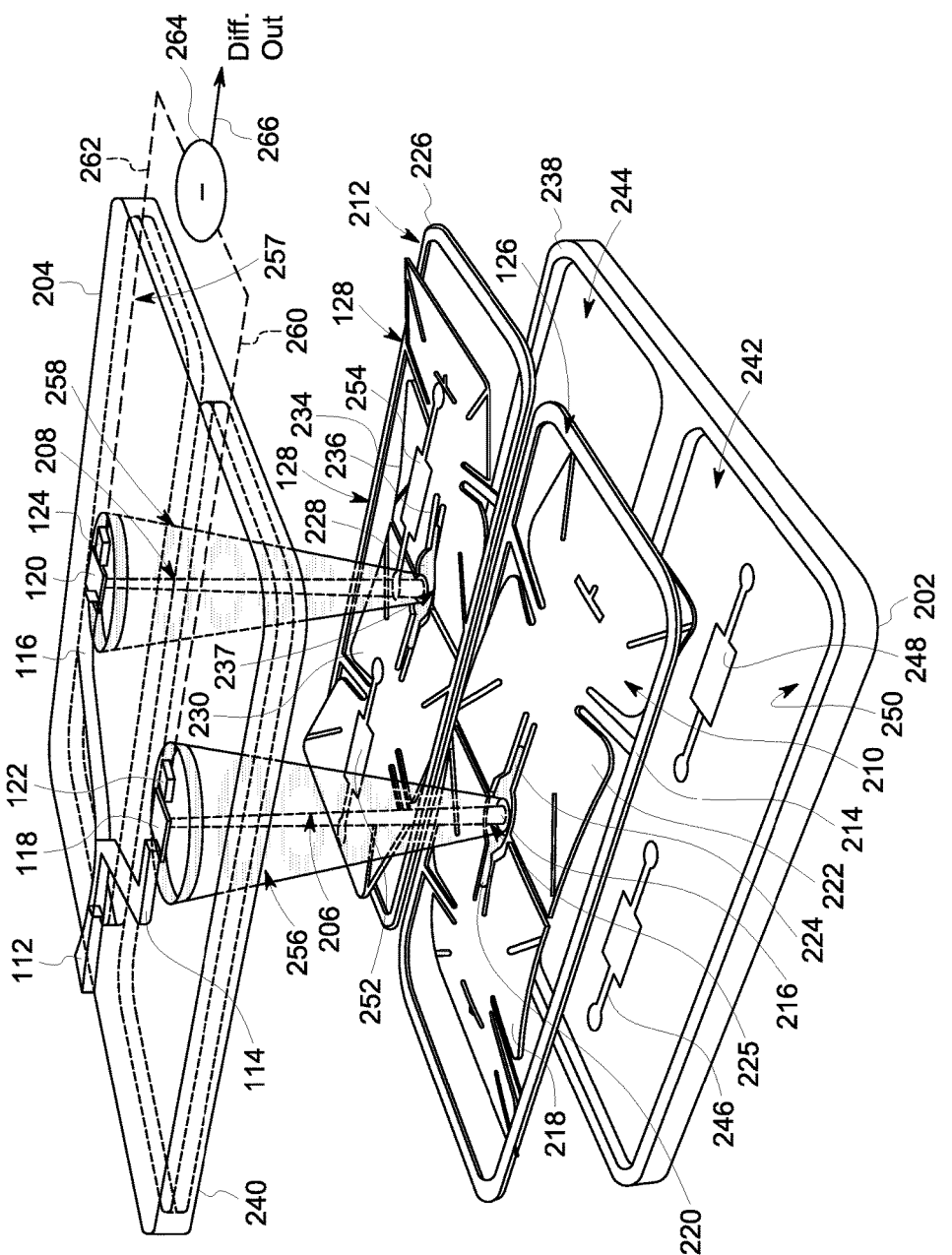
FIG. 2 is an exploded view of an exemplary resonator pair of the resonant opto-mechanical accelerometer shown in FIG. 1.

FIG. 2 is an exploded view of first resonator 126 and second resonator 128. As shown, first resonator 126 and second resonator 128 are substantially identical. In addition, first resonator 126 and second resonator 128 are mounted between a substrate 202 and a cover 204. Substrate 202 and cover 204 are manufactured as micro-electro-mechanical systems ("MEMS") wafers, such as silicon-on-insulator ("SOI") wafers. For example, substrate 202 and cover 204 may be manufactured as SOI wafers and/or as floated borosilicate glass (e.g., PYREX) wafers. In the exemplary embodiment, substrate 202 is manufactured as an SOI wafer, and cover 204 is manufactured as a PYREX wafer.

However, in various embodiments, cover 204 is manufactured as an SOI wafer and is not substantially absorptive to light, such as light having a wavelength of approximately 1300 nanometers. As a result, cover 204 transmits and reflects light, such that one or more excitation signals, such as, for example, a first light beam 206 and a second light beam 208, are able to pass through cover 204. For example, light at a wavelength of 1300 nanometers may be 20% reflected by cover 204 and 80% transmitted. Thus, cover 204 may absorb some light, but in some embodiments, the absorption should be minimal. For example, in some embodiments, the absorption is less than 10%. If it is desired to make cover 204 from a transparent material, such as glass, such that cover 204 does not reflect a substantial amount of light, a separate thin film layer (not shown) may be deposited on cover 204 to obtain the desired reflectance. For example, a layer of $Ta_2O_5$ having a thickness between 100 and 250 nanometers can be deposited onto a glass cover 204 to obtain a reflectance of approximately 20% to 25%. Accordingly, as used here, "transparent" means that light is able to be transmitted, at least partially, and with or without some attenuation through cover 204.

Excitation by light source 110 may result in amplitude self-stabilized oscillation frequencies and may improve frequency stability. In addition, optical interactions may serve to decouple conventional quality factor and gain detection trade-offs and may simplify device fabrication by facilitating uniform, large-gap, layouts as opposed to micron-sized electrode spacing within high aspect ratio etching steps. Further, the optical drive and readout features described herein may reduce or eliminate traditional error sources, such as errors introduced as a result of AC and/or DC drive signals applied to conventional electrostatic MEMS devices.

First resonator 126 includes a first proof mass 210. First proof mass 210 includes a first mounting perimeter 214, a central portion 216, a first leaf or a first portion 218, a first spring 220, a second leaf or a second portion 222, and a second spring 224. First portion 218 is coupled to central portion 216 by first spring 220, and second portion 222 is coupled to central portion 216 by second spring 224. Thus, first resonator 126 may be referred to as a "tuning fork" or "butterfly pattern" resonator. In some embodiments, first resonator 126 may also be a multiple beam opto-mechanical resonator that uses an out-of-plane linear vibrational oscillation. More generally, first resonator 126 may include any suitable resonator geometry or form factor. Central portion 216 may include a first reflective and absorptive surface or coating 225, which may be deposited on the surface of first resonator 126 that is closest to cover 204. If first resonator 126 is non-absorbing, first reflective coating 225 may also be deposited the surface of first resonator 126 that is furthest from the cover 204. However, in various embodiments, first reflective coating 225 cannot be a perfect reflector, and must permit some portion of first light beam 206 shining upon its surface to pass into central portion 216 for absorption.

Likewise, second resonator 128 includes a second proof mass 212. Second proof mass 212 includes a first mounting perimeter 226, a central portion 228, a first leaf or a first portion 230, a first spring 232, a second leaf or a second portion 234, and a second spring 236. First portion 230 is coupled to central portion 228 by first spring 232, and second portion 234 is coupled to central portion 228 by second spring 236. Thus, second resonator 128 may be referred to as a "tuning fork" or "butterfly pattern" resonator. Central portion 228 may include a second reflective surface or coating 237, which may be deposited on the surface of second resonator 128 that is closest to cover 204. If second resonator 128 is non-absorbing, second reflective coating 237 may also be deposited on the surface of second resonator 128 that is furthest from cover 204. However, in some embodiments, second reflective coating 237 cannot be a perfect reflector, and must permit some portion of second light beam 208 shining upon its surface to pass into central portion 228 for absorption.

During manufacturing, first proof mass 210 and second proof mass 212 are bonded or mounted between substrate 202 and cover 204. Specifically, first mounting perimeter 214 of first proof mass 210 is bonded or mounted between a substrate mounting surface 238 of substrate 202 and a cover mounting surface 240 of cover 204, such that first proof mass 210 is suspended between substrate 202 and cover 204 within a first cavity 242 defined between substrate 202 and cover 204. Similarly, first mounting perimeter 226 of second proof mass 212 is bonded or mounted between substrate mounting surface 238 of substrate 202 and cover mounting surface 240 of cover 204, such that second proof mass 212 is suspended between substrate 202 and cover 204 within a second cavity 244 defined between substrate 202 and cover 204. First cavity 242 and second cavity 244 may be sealed and filled with a gas or a mixture of gases, sealed under vacuum, and/or manufactured to include an aperture or opening (not shown) through which a gas or mixture of gases may be introduced into or evacuated from the device.

In addition, in the exemplary embodiment, a first electrode 246 and a second electrode 248 are bonded or mounted on an internal surface 250 of substrate 202, such that first electrode 246 is disposed substantially in proximity to, or under, first portion 218 of first proof mass 210, and second electrode 248 is disposed substantially in proximity to, or under, second portion 222 of first proof mass 210. In addition, a third electrode 252 and a fourth electrode 254 are bonded or mounted on an internal surface 257 of cover 204, such that third electrode 252 is disposed substantially in proximity to, or over, first portion 230 of second proof mass 212, and fourth electrode 254 is disposed substantially in proximity to, or over, second portion 234 of second proof mass 212.

In operation, and as described in greater detail below, first light beam 206 is directed by optical waveguide 112 through cover 204 onto central portion 216 of first proof mass 210, and second light beam 208 is directed by optical waveguide 112 through cover 204 onto central portion 228 of second proof mass 212. Each proof mass 210 and 212 oscillates or vibrates at a particular resonance frequency (as described in greater detail below) under the influence of an applied acceleration (or g force).

As first light beam 206 makes contact with central portion 216 of first proof mass 210, a reflected portion 256 of first light beam 206 is reflected by first reflective coating 225, and an absorbed portion of first light beam 206 is absorbed, as heat energy, by central portion 216. Reflected portion 256 is modulated to the resonance frequency of first proof mass 210 as it reflects from central portion 216 of first proof mass 210.

This modulation may be variously accomplished. For example, with respect to first resonator 126, the surfaces of cover 204 reflect some light, as does first resonator 126, such as, for example, central portion 216 of first proof mass 210. These surfaces form an optical cavity 310 having a length, L, and the reflected light from these surfaces interferes when it recombines at first photodetector 122 to cause the total reflected light intensity on first photodetector 122 to vary with the length, L, of optical cavity 310 between cover 204 and central portion 216. The variation is periodic with distance and the period is equal to half of the wavelength of light within optical cavity 310. Therefore, as resonator 126 vibrates, thereby changing the length, L, of optical cavity 310, the light intensity on photodetector 122 may also vary synchronously with the vibration of resonator 126. Other techniques may also be used to generate an oscillating light intensity on photodetector 122, such as depositing a reflective mirror (not shown) on a portion of resonator 126 that moves in and out of first light beam 206 as first resonator 126 vibrates, and/or fabricating a structure within ROMA 102 that partially shadows or prevents first light beam 206 from striking first resonator 126, where the amount of shadowing may vary as resonator 126 vibrates. These modulation techniques may be applied, in similar fashion, to second resonator 128.

Likewise, as second light beam 208 makes contact with central portion 228 of second proof mass 212, a reflected portion 258 of second light beam 208 is reflected by second reflective coating 237, and an absorbed portion of second light beam 208 is absorbed, as heat energy, by central portion 228. Reflected portion 258 is modulated to the resonance frequency of second proof mass 212 as it reflects from central portion 228 of second proof mass 212.

Thus, the frequencies associated with reflected portions 256 and 258 correspond to the resonance frequencies of first proof mass 210 and second proof mass 212, respectively, which depend upon the acceleration on ROMA 102 as well as the electromechanical stiffnesses of each proof mass 210 and 212.

As reflected portion 256 is reflected back through cover 204, reflected portion 256 is received by first photodetector 122. Similarly, as reflected portion 258 is reflected back through cover 204, reflected portion 258 is received by second photodetector 124. In response, first photodetector 122 generates a first electrical output signal 260 proportional to the frequency of received reflected portion 256, and second photodetector 124 generates a second electrical output signal 262 proportional to the frequency of received reflected portion 258.

First electrical output signal 260 and second electrical output signal 262 are transmitted (e.g., over one or more electrical wires) to an electrical circuit 264, such as a frequency counter or phase-locked-loop ("PLL"), that is configured to analyze first electrical output signal 260 and second electrical output signal 262, and, based upon the analysis, to output either digital or analog signals that are related to the oscillation frequency of resonators 126 and 128 and, in some embodiments, to other parameters such as the temperature of resonators 126 and 128. The digital signals from resonators 126 and 128 may in turn be subtracted from each other with either analog or digital electronics to provide an acceleration signal 266 that is representative of the acceleration measured by ROMA 102. Specifically, in the exemplary embodiment, electrical circuit 264 is configured to subtract one of first electrical output signal 260 and second electrical output signal 262 from the other. The difference between the two signals 260 and 262 corresponds to the acceleration on ROMA 102 and is provided as acceleration signal 266. Moreover, as described below, acceleration signal 266 is temperature independent.

Figure 3:
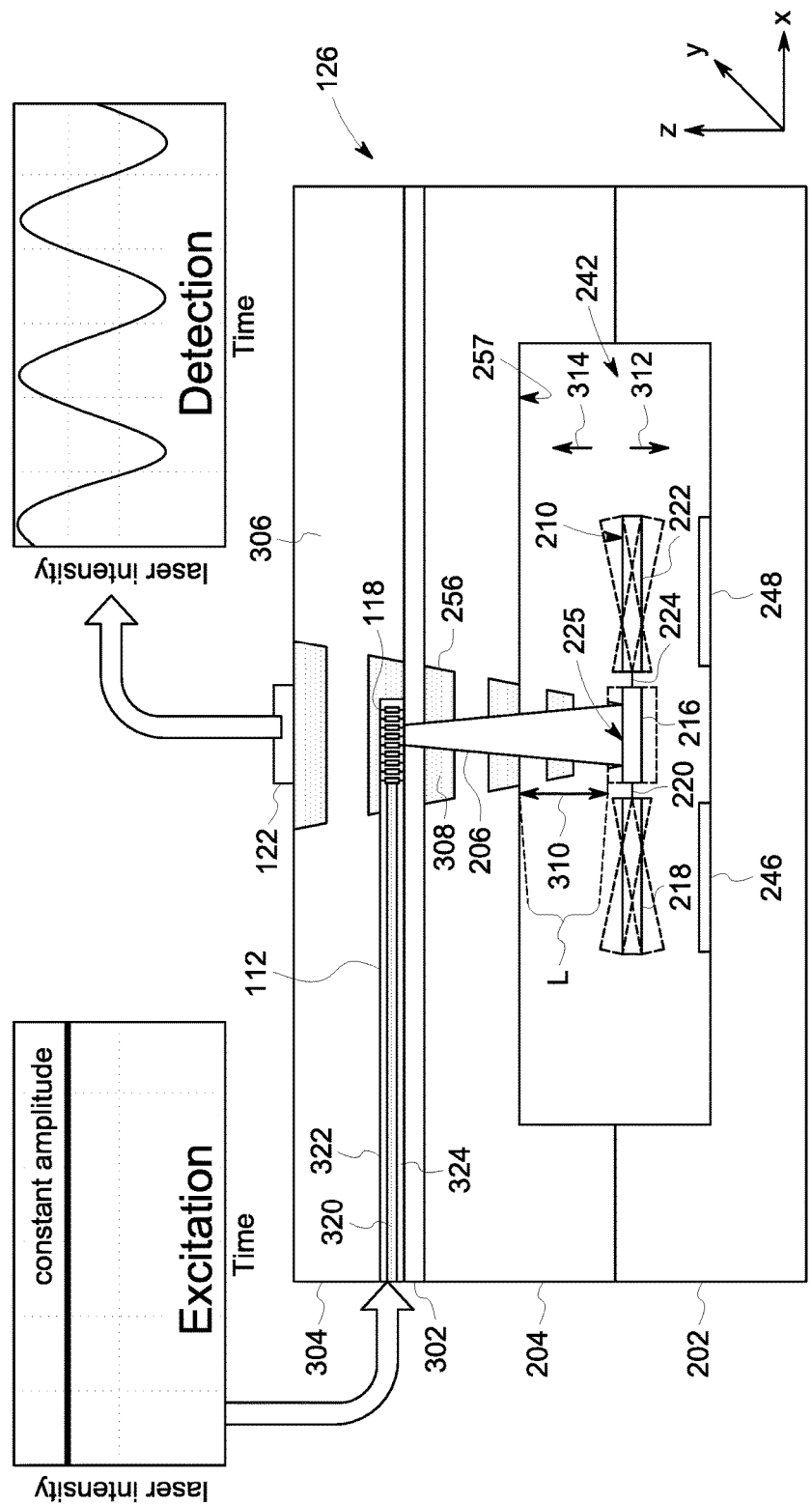
FIG. 3 is a schematic view of an exemplary resonator of the resonant opto-mechanical accelerometer shown in FIG. 1.

FIG. 3 is a schematic view of resonator 126 of ROMA 102 (shown at FIG. 1). Although resonator 126 is described with respect to FIG. 3, the same description applies to resonator 128.

Accordingly, resonator 126 includes, in addition to the elements described above, a cap 302 and a window 304. As described above, waveguide 112 terminates in first end 118 (e.g., an output coupler) that is constructed on either cap 302 or window 304. Waveguide 112 may be composed of a high refractive index core layer 320, such as a SiN or Si core layer, which may be surrounded above by a first low index layer 322 and below by a second low index layer 324. First low index layer 322 and second low index layer 324 may be manufactured from, for example, SiO$_2$. Because waveguide 112 may be directly attached to cover 204, the cladding material between core layer 320 and the cover 204 may be sufficiently thick to substantially prevent laser light leakage from core layer 320 into cover 204. For example, first low index layer 322 and second low index layer may be about 2 microns in thickness, which is generally sufficient to prevent substantial light leakage from core layer 320 into the cover 204. In addition, and in various embodiments, first photodetector 122 is mounted on an outer surface 306 of window 304.

As described above, central portion 216 of first resonator 126 may include a reflective surface coating, such as first reflective surface coating 225, on either or both surfaces to partially reflect light towards photodetector 122, thus forming optical cavity 310 for the purpose of generating modulated light intensity. In various embodiments, the reflected light intensity should be about 20%, but, in at least some embodiments, is preferably less than 50%. Moreover, the reflective coating, such as first reflective coating 225, should not absorb a significant amount of the laser light. For example, the absorption should be less than 5% in some embodiments, and, in other embodiments, is preferably much less than 1%.

In the exemplary embodiment, optical cavity 310 is a Fabry-Perot cavity and is configured to produce a standing light wave interference absorption and reflection pattern to allow for optical self-oscillation and detection by using only a single constant power light source (e.g., light source 110) As described previously, the reflectance of optical cavity 310 varies with the length, L, of optical cavity 310 between central portion 216 of first resonator 126 and cover 204, and this generates an optical signal that is measured by photodetector 122. For instance, when the reflected light intensity is large, then the amount of light absorbed in first resonator 126 (and/or a thin film on first resonator 126), is small, and vice-versa. Therefore, as first resonator 126 vibrates, the amount of light that it is absorbed is also oscillating synchronously. The absorbed light heats central portion 216 of first resonator 126 and can cause its mechanical properties to vary (as described in greater detail below).

For example, Young's modulus may be applied to describe the amount of strain in first resonator 126 as a function of applied stress. Specifically, the modulus may vary with temperature and, hence, with the vibration of first resonator 126. Variation in Young's modulus changes the stiffness of the first spring 220 and second spring 224, which directly affects the resonance frequency of first resonator 126. The dimensions of first resonator 126 may also vary due to the coefficient of thermal expansion of first resonator 126. For example, heating first resonator 126 will cause it to expand, which will in turn cause it to bend and change the length, L, of optical cavity 310. With a properly designed ROMA 102, when first resonator 1026 is located at a positon of high absorption, the absorbed light heats first resonator 126 and causes it to move to a location of lower absorption by changing the length, L, of optical cavity 310. With less absorbed light, first resonator 126 then cools down slightly and moves back into a position of larger absorption. The process repeats itself, causing first resonator 126 to oscillate at its natural frequency.

For example, as first spring 220 and second spring 224 increase in temperature, first portion 218 and second portion 222 may experience increased mechanical displacement about the z-axis as a result of acceleration of ROMA 102, because the stiffness of first spring 220 and second spring 224 have decreased. Conversely, as first spring 220 and second spring 224 decrease in temperature, first portion 218 and second portion 222 may experience decreased mechanical displacement about the z-axis as a result of acceleration of ROMA 102, because the stiffness of first spring 220 and second spring 224 have increased. Thus, as the temperature of resonator 126 varies, first proof mass 210 and second proof mass 212 may oscillate about the z-axis with increasing and/or decreasing resonance frequency.

In the exemplary embodiment, a first voltage may be applied to first electrode 246, and a second voltage may be applied to second electrode 248, to compensate for the change in temperature and/or to adjust the resonance frequency of first proof mass 210. For example, as the voltage generated by first electrode 246 is adjusted, the electrostatic force between first electrode 246 and first portion 218 of first proof mass 210 may vary, such that the electromechanical stiffness of first portion 218, which is suspended from central portion 216 by spring 220, increases and decreases with corresponding increases and decreases in voltage. Similarly, as the voltage generated by second electrode 248 is adjusted, the electrostatic force between second electrode 248 and second portion 222 of first proof mass 210 may vary, such that the electromechanical stiffness of second portion 222, which is suspended from central portion 216 by spring 224, increases and decreases with corresponding increases and decreases in voltage.

These changes in electromechanical stiffness affect the resonance frequency of first proof mass 210 during operation. For example, as the electromechanical stiffness of first proof mass 210 increases, the resonance frequency of first proof mass 210 may also increase, and as the electromechanical stiffness of first proof mass 210 decreases, the resonance frequency of first proof mass 210 may also decrease. An increasing and/or decreasing voltage may thus be applied between first electrode 246 and/or second electrode 248 and first proof mass 210 to adjust the electromechanical stiffness of first proof mass 210 and, in turn, the resonance frequency of first proof mass 210.

In addition, as reflected portion 256 of first light beam 206 reflects from central portion 216, reflected portion 256 travels along the z-axis within optical cavity 310 and reflects from the top and bottom surfaces of cover 204 back towards central portion 216. In other words, reflected portion 256 bounces back and forth between central portion 216 and the surfaces of the cover within optical cavity 310. Some of this reflected light escapes optical cavity 310 (as reflected portion 256) and travels along the z-axis towards photodetector 122, where it is converted, as described above, into first electrical output signal 260, which is proportional to the resonance frequency of resonator 126.

Thus, ROMA 102 detects acceleration based, in part, upon the frequency of reflected portion 256 of first light beam 206. As described above, however, the same resonation and detection processes occur within resonator 128, where second photodetector 124 converts reflected portion 258 of second light beam 208 into second electrical output signal 262.

More particularly, in the exemplary embodiment, first electrode 246 of first resonator 126 applies a bias voltage under first portion 218 of first proof mass 210, and second electrode 248 of first resonator 126 applies a bias voltage under second portion 222 of first proof mass 210. These bias voltages may, for example, increase the electromechanical stiffness of first proof mass 210 in a first direction 312 along the z-axis (because first proof mass 210 is attracted and/or repulsed by the electrostatic force developed as a result of the bias voltages), such that first proof mass 210 oscillates at a first resonance frequency in response to an acceleration in either first direction 312 or second direction 314.

Similarly, third electrode 252 of second resonator 128 applies a bias voltage over first portion 230 of second proof mass 212, and fourth electrode 254 of second resonator 128 applies a bias voltage over second portion 234 of second proof mass 212. These bias voltages may, for example, increase the electromechanical stiffness of second proof mass 212 in a second direction 314 along the z-axis (because second proof mass 212 is attracted and/or repulsed by the electrostatic force developed as a result of the bias voltages), such that second proof mass 212 oscillates at a second resonance frequency in response to an acceleration in either first direction 312 or second direction 314.

As a result of these opposing bias voltages, ROMA 102 may operate such that, as the resonance frequency of first resonator 126 increases, the resonance frequency of second resonator 128 decreases (and vice versa). Moreover, if the bias voltages applied to each resonator 126 and 128 are substantially equivalent, the difference between the first resonance frequency of first proof mass 210 and the second resonance frequency of second proof mass 212 will correspond to the actual acceleration upon ROMA 102. For example, differential output signal 266 will not be affected by the temperature of ROMA 102, because the variations in the first resonance frequency and the second resonance frequency arising as a result of temperature fluctuations will cancel in the difference calculation performed by electrical circuit 264 (as described above). ROMA 102 is thus capable of detecting acceleration independent of temperature.

As the acceleration on ROMA 102 varies during operation, it may be desirable to increase and/or decrease a scale factor associated with one or both of first resonator 126 and second resonator 128 to improve the dynamic range of ROMA 102. For example, as the acceleration on ROMA 102 increases, it may be desirable to increase and/or decrease the scale factor associated with one or both of first resonator 126 and/or second resonator 128. Similarly, as the acceleration on ROMA 102 decreases, it may be desirable to increase and/or decrease the scale factor associated with one or both of first resonator 126 and second resonator 128.

To adjust the scale factor, the bias voltages generated by one or more of first electrode 246, second electrode 248, third electrode 252, and/or fourth electrode 254 may be increased and/or decreased. For example, at large accelerations, the resonance frequencies of first resonator 126 and second resonator 128 may fluctuate rapidly. To accommodate for this frequency instability, one or more electrodes 246, 248, 252, and/or 254 may be controlled (e.g., by controller 108) to increase and/or decrease the bias voltage applied to first proof mass 210 and/or second proof mass 212. For example, as the bias voltage is increased, the resonance frequency of each proof mass 210 and 212 may also increase. Thus, the resonance frequencies of first proof mass 210 and second proof mass 212 may be scaled up and down to accommodate increases and decreases in acceleration. In some embodiments, ROMA 102 may detect g forces ranging from 0 g to 50,000 g.

First resonator 126 and/or second resonator 128 may also be dynamically balanced as part of an initial calibration function and/or during operation. More particularly, first portion 218 of first proof mass 210 and second portion 222 of first proof mass 210 may vary slightly in mass (e.g., due to imperfections in the manufacturing process). Similarly, first portion 230 of second proof mass 212 and second portion 234 of second proof mass 212 may vary slightly in mass. These small deviations in mass may unbalance first proof mass 210 and second proof mass 212, such that the resonance frequencies of first resonator 126 and second resonator 128 are affected.

To balance first resonator 126 and/or second resonator 128, one or more bias voltages may be applied, as described above, to either or both of first proof mass 210 and/or second proof mass 212. In particular, first electrode 246 and second electrode 248 may apply one or more bias voltages to first proof mass 210, and third electrode 252 and fourth electrode 254 may apply one or more bias voltages to second proof mass 212.

Embodiments of the resonant opto-mechanical accelerometer thus include a light source, such as a laser, a first resonator, and a second resonator. A resonance frequency of each resonator is responsive to an acceleration, and the light source shines a light beam on each resonator. The resonators modulate the light to a frequency that corresponds to the resonance frequency, and the modulated light is sensed at each resonator by a corresponding photodetector. The photodetectors generate first and second electrical output signals in response, and these electrical output signals are used to generate a temperature independent acceleration measurement. In addition, a plurality of electrodes are disposed in relation to each resonator, such that one or more proof masses associated with each resonator may be dynamically balanced and/or a scale factor associated with the modulated light increased or decreased as a function of acceleration.

Exemplary technical effects of the resonant electro-optical accelerometer described herein include, for example: (a) optical self-excitation and detection; (b) real-time dynamic resonator balancing; (c) real-time adjustments to scale factor; and (d) differential resonator output for temperature independent acceleration measurement.

Exemplary embodiments of a resonant opto-mechanical accelerometer and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where acceleration measurement is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An accelerometer comprising:
    a controller;
    a light source operatively coupled to said controller;
    a bifurcated waveguide coupled to said light source and configured to receive light output by said light source, said bifurcated waveguide comprising:
        a first waveguide portion; and
        a second waveguide portion;
    a first resonator operatively coupled to said controller, said first resonator out of plane with said first waveguide portion and configured to receive light from said first waveguide portion, said first resonator comprising a first proof mass; and
    a second resonator operatively coupled to said controller, said second resonator out of plane with said second waveguide portion and configured to receive light from said second waveguide portion, said second resonator comprising a second proof mass, said second proof mass different from said first proof mass.

2. The accelerometer of claim 1, wherein said first proof mass comprises:

a central portion;
a first spring;
a first portion coupled to said central portion by said first spring;
a second spring; and
a second portion coupled to said central portion by said second spring.

3. The accelerometer of claim 2, further comprising at least one electrode disposed in proximity to at least one of said central portion of said first proof mass, said first portion of said first proof mass, and said second portion of said first proof mass.

4. The accelerometer of claim 3, wherein said at least one electrode is configured to generate a bias voltage between at least one of said central portion of said first proof mass, said first portion of said first proof mass, and said second portion of said first proof mass.

5. The accelerometer of claim 2, wherein said second proof mass comprises:
a central portion;
a first spring;
a first portion coupled to said central portion by said first spring;
a second spring; and
a second portion coupled to said central portion by said second spring.

6. The accelerometer of claim 5, further comprising at least one electrode disposed in proximity to at least one of said central portion of said second proof mass, said first portion of said second proof mass, and said second portion of said second proof mass.

7. The accelerometer of claim 6, wherein said at least one electrode is configured to generate a bias voltage between at least one of said central portion of said second proof mass, said first portion of said second proof mass, and said second portion of said second proof mass.

8. The accelerometer of claim 1, further comprising a first photodetector configured to receive light reflected from said first proof mass.

9. The accelerometer of claim 8, further comprising a second photodetector configured to receive light reflected from said second proof mass.

10. The accelerometer of claim 1, further comprising a cover disposed over said first resonator, wherein an optical cavity is defined between said cover and a central portion of said first proof mass, and wherein said central portion is configured to oscillate within said optical cavity at a resonance frequency of said first proof mass.

11. The accelerometer of claim 1, wherein the light received by said first resonator from said first waveguide portion is unmodulated, and wherein said first proof mass is configured to:
absorb the light received from said first waveguide portion; and
vibrate in the presence of the light received from said first waveguide portion.

12. A resonator for use in an accelerometer, said resonator comprising:
a substrate;
a transparent cover; and
a proof mass mounted between said substrate and said transparent cover, said proof mass comprising:
a central portion that includes a reflective region, said reflective region of said central portion configured to reflect light received from an out of plane waveguide portion back towards the out of plane waveguide portion;
a first spring;
a first portion coupled to said central portion by said first spring;
a second spring; and
a second portion coupled to said central portion by said second spring.

13. The resonator of claim 12, wherein an optical cavity is defined between said transparent cover and said proof mass.

14. The resonator of claim 13, wherein said optical cavity comprises a Fabry-Perot cavity.

15. The resonator of claim 12, further comprising a coating disposed over a surface of said central portion of said proof mass that is partially reflecting and partially absorbing.

16. The resonator of claim 12, further comprising a partially reflective coating disposed over one or both surfaces of said transparent cover.

17. The resonator of claim 12, further comprising at least one electrode disposed in proximity to at least one of said central portion, said first portion, and said second portion.

18. The resonator of claim 12, wherein said substrate comprises at least one of silicon and floated borosilicate glass.

19. An accelerometer comprising:
a light source;
a waveguide coupled to said light source and configured to receive light output by said light source; and
a resonator out of plane with said waveguide and configured to receive light from said waveguide, said resonator comprising a proof mass, said proof mass configured to reflect at least a portion of the light received from said waveguide back towards said waveguide.

20. The accelerometer of claim 19, wherein said proof mass of said resonator comprises:
a central portion;
a first spring;
a first portion coupled to said central portion by said first spring;
a second spring; and
a second portion coupled to said central portion by said second spring.

21. The accelerometer of claim 20, further comprising at least one electrode disposed in proximity to at least one of said central portion, said first portion, and said second portion.

22. The accelerometer of claim 19, further comprising a photodetector configured to receive light reflected from said proof mass.

* * * * *